United States Patent
Rao et al.

(10) Patent No.: US 12,462,265 B2
(45) Date of Patent: Nov. 4, 2025

(54) SYSTEM AND METHOD FOR UNDERSTANDING INFLUENCER REACH WITHIN AN AUGMENTED MEDIA INTELLIGENCE ECOSYSTEM

(71) Applicant: PAYPAL, INC., San Jose, CA (US)

(72) Inventors: Anita P. Rao, Cupertino, CA (US); Babji Nagireddi, Chennai (IN); Srujan Jha, Chennai (IN); Rajkumar Perumal, Vellore (IN); Lenin Kumar Babu Pothabattula, Chennai (IN)

(73) Assignee: PAYPAL, INC., San Jose, CA (US)

( * ) Notice: Subject to any disclaimer, the term of this patent is extended or adjusted under 35 U.S.C. 154(b) by 42 days.

(21) Appl. No.: 18/508,919

(22) Filed: Nov. 14, 2023

(65) Prior Publication Data
US 2024/0161132 A1     May 16, 2024

Related U.S. Application Data

(63) Continuation of application No. 17/828,153, filed on May 31, 2022, now Pat. No. 11,861,630, which is a (Continued)

(51) Int. Cl.
*G06Q 30/0201* (2023.01)
*G06F 3/0482* (2013.01)
(Continued)

(52) U.S. Cl.
CPC ....... *G06Q 30/0201* (2013.01); *G06F 3/0482* (2013.01); *G06F 16/90332* (2019.01); (Continued)

(58) Field of Classification Search
CPC ............... G06Q 30/0201; G06Q 50/01; G06F 16/9038; G06F 16/90332; G06F 3/0482; G06N 20/00
See application file for complete search history.

(56) References Cited

U.S. PATENT DOCUMENTS 7,065,524 B1   6/2006 Lee
8,209,218 B1   6/2012 Basu et al.
(Continued)

FOREIGN PATENT DOCUMENTS

WO   2006041425   4/2006

OTHER PUBLICATIONS

Alp Z.Z., et al., "Identifying Topical Influencers on Twitter Based on User Behavior and Network Topology," Knowledge Based Systems, vol. 141, Nov. 21, 2017, 11 pages.
(Continued)

*Primary Examiner* — Beau D Spratt
(74) *Attorney, Agent, or Firm* — HAYNES AND BOONE, LLP

(57) ABSTRACT

Aspects of the present disclosure involve systems, methods, devices, and the like for augmented media intelligence using Artificial Intelligence (AI), Machine Learning (ML), Natural Language Processing (NLP), data analytics and data visualization. In one embodiment, a system is introduced that can retrieve real-time data from social media platforms to perform augmented media intelligence analysis and take real time actions if necessary. In another embodiment, the augmented media intelligence is design to use the machine learning and natural language processing capabilities and social currency means for understanding an influencers reach within the augmented media intelligence system via an influencer score.

20 Claims, 7 Drawing Sheets

Related U.S. Application Data continuation of application No. 16/048,696, filed on Jul. 30, 2018, now Pat. No. 11,348,125, which is a continuation-in-part of application No. 15/844,257, filed on Dec. 15, 2017, now abandoned.

(51) Int. Cl.
*G06F 16/9032* (2019.01)
*G06F 16/9038* (2019.01)
*G06N 20/00* (2019.01)
*G06Q 50/00* (2012.01)

(52) U.S. Cl.
CPC ......... *G06F 16/9038* (2019.01); *G06N 20/00* (2019.01); *G06Q 50/01* (2013.01)

(56) References Cited

U.S. PATENT DOCUMENTS

| | | | |
|---|---|---|---|
| 8,312,056 B1 | 11/2012 | Peng et al. | |
| 8,364,519 B1 | 1/2013 | Basu et al. | |
| 8,935,327 B1 | 1/2015 | Agassy et al. | |
| 9,122,989 B1 | 9/2015 | Morris et al. | |
| 9,189,797 B2 | 11/2015 | Ghosh et al. | |
| 9,269,112 B1 | 2/2016 | Manimaran | |
| 9,288,123 B1 | 3/2016 | Safford et al. | |
| 9,430,738 B1 | 8/2016 | Hui et al. | |
| 9,548,828 B1 | 1/2017 | Kuznetsov | |
| 9,633,399 B2 | 4/2017 | George et al. | |
| 9,646,047 B2 | 5/2017 | Malkin et al. | |
| 9,946,975 B2 | 4/2018 | Paul et al. | |
| 9,953,080 B1 | 4/2018 | Compton | |
| 9,959,505 B1 | 5/2018 | Milakovich | |
| 10,346,887 B1 | 7/2019 | Shariff et al. | |
| 10,452,729 B1 | 10/2019 | Keegan et al. | |
| 10,599,644 B2 | 3/2020 | Braz et al. | |
| 10,601,937 B2 | 3/2020 | Holzband et al. | |
| 12,020,265 B1* | 6/2024 | Mao ................. | G06Q 30/0243 |
| 2008/0255924 A1 | 10/2008 | Chien et al. | |
| 2009/0119173 A1 | 5/2009 | Parsons et al. | |
| 2010/0121849 A1 | 5/2010 | Goeldi | |
| 2011/0225174 A1 | 9/2011 | Artzt et al. | |
| 2012/0143963 A1 | 6/2012 | Kennberg et al. | |
| 2012/0185544 A1 | 7/2012 | Chang et al. | |
| 2012/0233258 A1 | 9/2012 | Vijayaraghavan et al. | |
| 2012/0296969 A1 | 11/2012 | Howard | |
| 2013/0014136 A1 | 1/2013 | Bhatia et al. | |
| 2013/0031018 A1 | 1/2013 | Jellum | |
| 2013/0041860 A1 | 2/2013 | Lawrence et al. | |
| 2013/0124653 A1* | 5/2013 | Vick ....................... | H04L 51/52 709/206 |
| 2013/0173485 A1 | 7/2013 | Ruiz et al. | |
| 2013/0263019 A1 | 10/2013 | Castellanos et al. | |
| 2013/0268516 A1 | 10/2013 | Chaudhri et al. | |
| 2013/0304726 A1 | 11/2013 | Sandulescu et al. | |
| 2013/0317808 A1 | 11/2013 | Kruel et al. | |
| 2013/0325850 A1 | 12/2013 | Redmond et al. | |
| 2014/0011586 A1 | 1/2014 | Vorster et al. | |
| 2014/0025478 A1 | 1/2014 | Mischuk et al. | |
| 2014/0114978 A1 | 4/2014 | Chatterjee et al. | |
| 2014/0129331 A1* | 5/2014 | Spivack ............. | G06Q 30/0255 705/14.53 |
| 2014/0195518 A1 | 7/2014 | Kelsey et al. | |
| 2014/0278815 A1 | 9/2014 | Grant et al. | |
| 2014/0324717 A1 | 10/2014 | Ayers et al. | |
| 2015/0012331 A1 | 1/2015 | Carter et al. | |
| 2015/0012502 A1 | 1/2015 | Sensharma | |
| 2015/0066948 A1 | 3/2015 | Carlton et al. | |
| 2015/0120717 A1 | 4/2015 | Kim et al. | |
| 2015/0169139 A1 | 6/2015 | Leva et al. | |
| 2015/0199713 A1 | 7/2015 | Sherman | |
| 2015/0317564 A1 | 11/2015 | Chen et al. | |
| 2015/0339358 A1 | 11/2015 | Balasubramanyan et al. | |
| 2015/0348216 A1 | 12/2015 | Gustafson et al. | |
| 2015/0379529 A1 | 12/2015 | Batrakov | |
| 2016/0019579 A1 | 1/2016 | Sims et al. | |
| 2016/0026919 A1 | 1/2016 | Kaisser et al. | |
| 2016/0035046 A1 | 2/2016 | Gupta et al. | |
| 2016/0036973 A1 | 2/2016 | Harasimiuk et al. | |
| 2016/0048370 A1 | 2/2016 | Zenoff | |
| 2016/0072903 A1 | 3/2016 | Chakra et al. | |
| 2016/0162588 A1 | 6/2016 | Tuchman et al. | |
| 2016/0213994 A1 | 7/2016 | Tilton et al. | |
| 2016/0335649 A1 | 11/2016 | Ghosh et al. | |
| 2017/0046390 A1 | 2/2017 | Jain et al. | |
| 2017/0053131 A1 | 2/2017 | Modi et al. | |
| 2017/0083926 A1 | 3/2017 | Karcher et al. | |
| 2017/0140397 A1 | 5/2017 | Booker et al. | |
| 2017/0193397 A1 | 7/2017 | Kottha et al. | |
| 2017/0206610 A1 | 7/2017 | Carter et al. | |
| 2017/0221168 A1 | 8/2017 | Baughman et al. | |
| 2017/0262451 A1* | 9/2017 | Milner ................. | G06F 16/285 |
| 2017/0270210 A1 | 9/2017 | Padmanabhan et al. | |
| 2017/0277691 A1 | 9/2017 | Agarwal | |
| 2018/0114128 A1 | 4/2018 | Libert et al. | |
| 2018/0174190 A1 | 6/2018 | Ferreira et al. | |
| 2018/0315283 A1 | 11/2018 | Brosnan | |
| 2018/0357564 A1 | 12/2018 | Braghin et al. | |
| 2019/0034976 A1* | 1/2019 | Hamedi ............ | G06Q 30/0243 |
| 2019/0108530 A1 | 4/2019 | Varghese et al. | |
| 2019/0114651 A1 | 4/2019 | Eyal et al. | |
| 2019/0122139 A1 | 4/2019 | Perez | |
| 2019/0378074 A1 | 12/2019 | McPhatter et al. | |

OTHER PUBLICATIONS

Batrinca B., et al., "Social Media Analytics: A Survey of Techniques, Tools and Platforms," AI & Society, Retrieved from Internet URL: https://link.springer.com/article/10.1007/s00146-014-0549-4, Jul. 26, 2014, 28 pages.

Cossu J.V., et al., "Detecting Real-World Influence Through Twitter," Retrieved from Internet URL: https://arxiv.org/pdf/1506.05903.pdf, Retrieved on Jul. 20, 2015, 8 pages.

IBM Software., "IBM Social Media Analytics, Analyze Social Media Data to Improve Business Outcomes," 2013, 8 pages.

International Search Report and Written Opinion for Application No. PCT/US2018/065873 mailed on Mar. 8, 2019, 7 pages.

Joachimsthaler E., et al., "Social Currency: Why Brands Need to Build and Nurture Social Currently," Vivaldi Partners, Retrieved from Internet URL: https://images.fastcompany.com/VivaldiPartners_SocialCurrency.pdf, Retrieved on Jul. 1, 2011, 68 pages.

Khan G., "Four Types of Social Media Analytics Explained", Analytic Bridge, Retrieved from Internet URL: https://www.analyticbridge.datasciencecentral.com/profiles/blogs/4-types-of-social-media-analytics-explained, Apr. 10, 2017, 6 pages.

Parker G.G., et al., "Platform Revolution: How Networked Markets Are Transforming the Economy and How to Make them Work for You," Mar. 28, 2016, 8 pages.

Rios S.A., et al., "Semantically enhanced network analysis for influencer identification in online social networks," Neurocomputing, vol. 326-327, Sep. 20, 2017, 11 pages.

* cited by examiner

SYSTEM AND METHOD FOR UNDERSTANDING INFLUENCER REACH WITHIN AN AUGMENTED MEDIA INTELLIGENCE ECOSYSTEM

CROSS REFERENCE TO RELATED APPLICATIONS

This application is a continuation of U.S. patent application Ser. No. 17/828,153 filed May 31, 2022, which is the continuation of U.S. patent application Ser. No. 16/048,696, filed Jul. 30, 2018, issued on May 31, 2022 as U.S. Pat. No. 11,348,125, which is related to and claims benefit of priority to Indian Provisional Application No. 201841022254, filed Jun. 14, 2018, which is a continuation in part of U.S. Ser. No. 15/844,257 filed Dec. 15, 2017.

TECHNICAL FIELD

The present disclosure generally relates to intelligent information visualization for an enterprise system, and more specifically, to data analytics and data visualization for understanding influencer reach within an augmented media intelligence ecosystem.

BACKGROUND

Today up to one third of the world's population is on a social media platform including social applications, blogs, videos, online news, etc. This data can produce up to 2.5 Exabyte of data per day. Oftentimes, this data is monitored so that if a public relationship crisis or other significant event occurs, campaigns and media events can be established in response to such crisis. Monitoring the data, however, may be a challenge due to the volume, quality, veracity and speed of data received. Further, if a change occurs, the ability to recover from a media event is essential as the business or its key performance indicators may be impacted. Thus, it would be beneficial to have the capability to monitor plan, monitor, and build strategy around those individuals and organizations whose opinions have significant media reach so that appropriate campaigns and media responses can be created.

Figure 1:
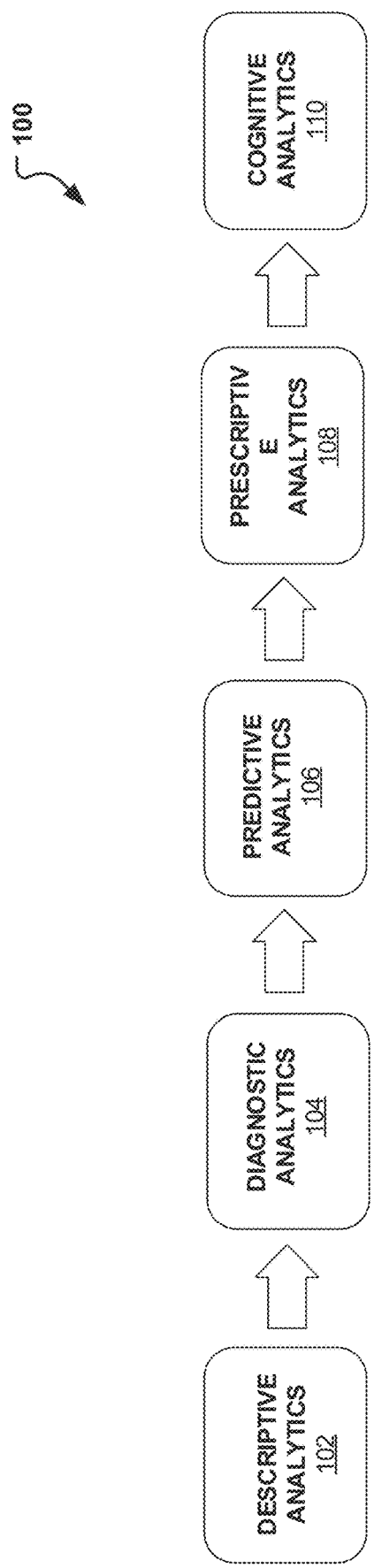
FIG. 1 illustrates a flowchart for generating augmented media intelligence.

Embodiments of the present disclosure and their advantages are best understood by referring to the detailed description that follows. It should be appreciated that like reference numerals are used to identify like elements illustrated in one or more of the figures, whereas showings therein are for purposes of illustrating embodiments of the present disclosure and not for purposes of limiting the same.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Aspects of the present disclosure involve systems, methods, devices, and the like for augmented media intelligence using Artificial Intelligence (AI), Machine Learning (ML), Natural Language Processing (NLP), data analytics and data visualization. In one embodiment, a system is introduced that can retrieve real-time data from social media platforms to perform augmented media intelligence analysis and take real time actions if necessary. In another embodiment, the augmented media intelligence is design to use the machine learning and natural language processing capabilities and social currency means for understanding an influencers reach within the augmented media intelligence system via an influencer score. The influencer score along with the real-time data may be presented as a chart, graph, plot and the like where the augmented media system is designed to generate dashboards, and reports for user visualization on an interactive user interface, where the reports are based in part on the influencer data determined, retrieved, measured, and categorized.

Enterprise media generally relates to all forms of digital media including social media, blogs, videos, online news, etc. In particular, enterprise social media relates to a category of online communications which includes corporate based input, interactions, content-sharing, and collaboration amongst various venues. The data generated can be very useful in understanding responses to product releases, content-sharing, strategy, response to crisis, etc. However, the data is very voluminous and is not always structured. Therefore, a method for ingesting large volumes of multi-faceted data, categorizing and classifying it, and understanding its impact is important. Further, understanding how to recover from a media event is essential as it can impact a business and/or the business key performance indicators. Therefore, it would be important to understand how to plan, prepare, and recover after a media event is important. For example, if a negative event occurs, understanding how to recover needs to be understood. Alternatively, if a positive event occurs, understanding how to prolong the event so that the engagement may be maximized needs to be understood. This type of information can be captured and appropriate plan can be put in place with the understanding of an influencer's reach within an augemented media intelligence system.

Conventionally, in social media enterprise, such data can be analyzed using one or more of five social media available. FIG. 1 presents the five media analytic methods available. In particular, FIG. 1 illustrates a flowchart 100 for generating augmented media intelligence by integrating not only the five media analytic methods, but also an adding a fifth Cognitive media analytical method. Further, FIG. 1 presents flowchart 100 that enables the use of all five media analytic methods to enable augmented media intelligence in a self-sustaining ecosystem.

As illustrated, data analytics can begin with descriptive analytics 102. Descriptive analytics is the analysis of events after they have taken place. For example, media posts, mentions, views, comments, page views, and the like, can be analyzed to decipher what happened based on the data retrieved. The data retrieved may derive from one or more serves, devices, systems, clouds, etc., which can include enterprise media. Next, the data retrieved may be analyzed using diagnostic analytics 104. Diagnostic analytics 104 are useful in determining why an event, response, comment, or other occurred. Diagnostic analytics 104 involves learning based on the monitoring why a result occurred and what did/did not work. Because the analytics includes learning from the data retrieved, machine learning algorithms and even statistics in determining correlations between media sentiments and the business impact on key performance indicators (KPIs). Upon retrieving and analyzing the, what and why of the data, predictive analytics 106 may be performed to determine the what/why will happen in future. Predictive analytics 106 is the analysis of the data retrieved to predict future events. For example, predictive analytics 106 may be used to predict the media impact of a given campaign. That is to say, using historical data, media responses, and large data analysis, predictions can be made as to how a product release, post, announcement, or campaign will be received in media and might translate into a future event. Next, prescriptive analytics 108 may be performed on the enterprise data. Prescriptive analytics 108 extends the analysis of historical trends from the data retrieved to discover trends and patterns of behavior in the data. The patterns and trends identified can then be used to provide insight and/or prescribe future events, responses, postings, etc. For example, prescriptive analysis 108 may be used to recommend a future campaign for the business. Finally, the last of the fifth social media analytics, Cognitive Analytics 110 continues the analysis by taking into account the reason for a user's behavior and use the analysis to decipher the emotional, psychical, intellectual, and subconscious reasons for the same. The information gathered from the cognitive analytics 110 can then be used for example, to aid marketers in delivering real-time personalized experiences to customers.

Note that the descriptive and diagnostic analytics 102,104 can be categorized as reactive analytics as a "look back" at the data retrieved from the media sources is analyzed. Alternatively, the predictive, prescriptive analytics, and cognitive analytics 106,108, and 110 can be categorized as proactive analytics as a "look ahead" on how to respond based on the data retrieved is considered.

FIG. 1 illustrates data analytics that can occur from enterprise data, however, due to the volume, veracity, and speed of data, data ingestion is possible through the creation of a media intelligence platform which can deliver this capability in real-time. For example, in descriptive analytics, the probability of an event occurring is possible with real-time listening and monitoring of the enterprise data. As another example, cognitive analytics may be performed using the real-time data to predict and analyze patterns in the data.

Figure 2:
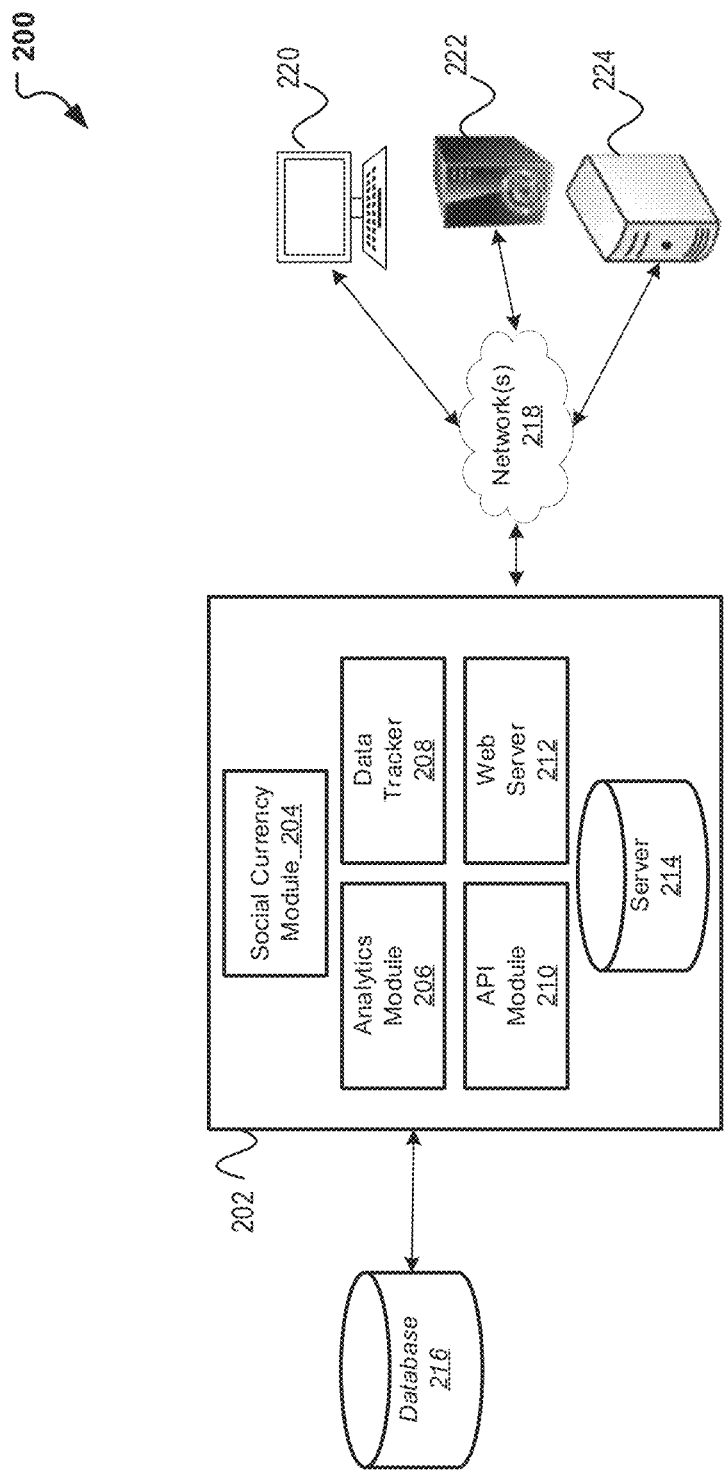
FIG. 2 illustrates a block diagram illustrating a data analytics and visualization system for augmented media intelligence.

FIG. 2 illustrates a system designed to function as a media intelligence platform 200 for real-time data analytics. In particular, FIG. 2 illustrates a block diagram illustrating a data analytics and visualization system for augmented media intelligence. The media intelligence platform 200 can include at least a database(s) 216, an augmented media system 202, and/or external peripherals 220-224. The augmented media system 202 can be a system design to enable the real-time presentation, analytics, and visualization of media data. The augmented media system can include a social currency module 204, analytics module 206, data tracker 208, Application Programming Interface (API) 210, web server 212, and server 214. The augmented media system 202 can perform the real-time analytics included in FIG. 1 using at least analytics module 206. In particular, descriptive analytics 102, diagnostics analytics 104, predictive analytics 106 and prescriptive analytics can occur on the analytics module 206 for monitoring, responding, predicting and prescribing how to respond to a campaign, event, feedback, etc. etc. To perform such analytics, the analytics module 206 may include an artificial intelligence engine with natural language processing capabilities in order to respond to complex queries and perform the real-time analytics for the augmented media system 202.

As illustrated, the augmented media system 202 can also include an application programming interface (API) module 210. The API module 210 can act as an interface with one or more database(s) 216. In addition, API module can enable data tracker module 208 to retrieve data from database nodes and/or monitor movements of the data across the database nodes and other media data deriving from the network(s) 218. In some embodiments, the API module 210 may establish a universal protocol for communication of data between the API module 210 and each of the database(s) 216 and/or nodes. In other embodiments, the API module 210 may generate a data request (e.g., a query) in any one of several formats corresponding to the database 216. Based on a request for data intending for a specific database from the data tracker module 208, the API module 210 may convert the request to a data query in a format (e.g., an SQL query, a DMX query, a Gremlin query, a LINQ query, and the like) corresponding to the specific database. Additionally, the server 214 may store, and retrieve data previously stored for use with the analytics module 206.

In some embodiments, the augmented media system 202 can communicate with external devices, components, peripherals 220-224 via API module 210. API module 210 can, therefore, act as an interface between one or more networks 218 (and systems/peripherals 220-224) and augmented media system 202. Peripherals 220-224 can include networks, servers, systems, computers, devices, clouds, and the like which can be used to communicate digital media. For example, peripherals 220-224 can be used to communicate digital media including but not limited to, social media, blogs, videos, online news, etc. The data communicated (e.g., scraped) from the web over the network 218 can be used for the real-time presentation, analytics, and visualization of media data.

The augmented media system 202, as indicated, includes a server 214 and network 218 and thus can be a network-based system which can provide the suitable interfaces that enable the communication using various modes of communication including one or more networks 218. The augmented media system 202 can include the web server 212, and API module 210 to interface with the at least one server 214. It can be appreciated that web server 212 and the API module 210 may be structured, arranged, and/or configured to communicate with various types of devices, third-party devices, third-party applications, client programs, mobile devices and other peripherals 220-224 and may interoperate with each other in some implementations.

Web server 212 may be arranged to communicate with other devices and interface using a web browser, web browser toolbar, desktop widget, mobile widget, web-based application, web-based interpreter, virtual machine, mobile applications, and so forth. Additionally, API module 210 may be arranged to communicate with various client programs and/or applications comprising an implementation of an API for network-based system and augmented media system 202. For example the augmented media system 202 may be designed to provide an application with an interactive web interface, platform, and/or browser by using the web server 212. The interactive web interface, may enable a user to view different reports or performance metrics related to a particular organization group. For example, a Marketing or Product Group within a corporation may benefit from real-time media data that can be tailored to provide plots, statistics, diagrams, and other information that can be used to market a new campaign or track product performance. In particular, in one embodiment, a marketing team for example may use the augmented media system to publish and monitor content across social media channels driving campaign activation and to provide insights on trends and audience engagement based on the content published. Therefore, in this embodiment, the marketing team can use the augmented media system 202 to actively monitor and listen to the social media traffic (internally and externally) and measure and analyze the performance of a campaign. As another example, the interactive web interface may be used by the customer service team to service and answer questions from customers and prospective clients. Still in another example, the interactive web interface may be used to correlate a campaign to the call volume at customer service centers. The correlation data can be used to predict, forecast, and prescribe staffing at customer service centers.

In some embodiments, understanding the client and/or customer is important for determining how to respond and/or present information. Therefore, in some embodiments, the augmented media system 202 can also include the social currency module 204. The social currency module 204 is a component designed to aid in providing hyper-personalized content to one or more users in real-time (at the right time) using augmented media system 202. In general, social currency can be described as the response and resources that arise from content and information shared about a brand or other through social networks, communities, and other social media. Therefore, the social currency module 204 is a component that evaluates social media users and organizations beneficiating from social media to provide hyper-personalized content in real time in an effort to deliver content that can help increase a user's propensity to engage in a purchase or respond to a product, campaign, or other. The social currency module 204 can provide the content by evaluating: 1) a user's affiliation to a community, 2) listening to conversations and interactions among individuals, 3) through group and information sharing, 4) through monitoring for advocating related to a brand, and 5) detecting knowledge sharing in a given area. Evaluating the user and content using the social currency elements mentioned provides the opportunity to identify the user, analyze their social behavior, and engage them, to influence a successful outcome. The social currency module 204 can work in conjunction with the analytics module 206 and data tracker 208 to listen, monitor, analyze, and categorize the media data to deliver insights via platforms on a dashboard and/or via reports. In some embodiments, the augmented media system 202 operates in real-time by scraping social media and analyzing the digital data for the presentation in an organized report, dashboard, or other platform.

Figure 3:
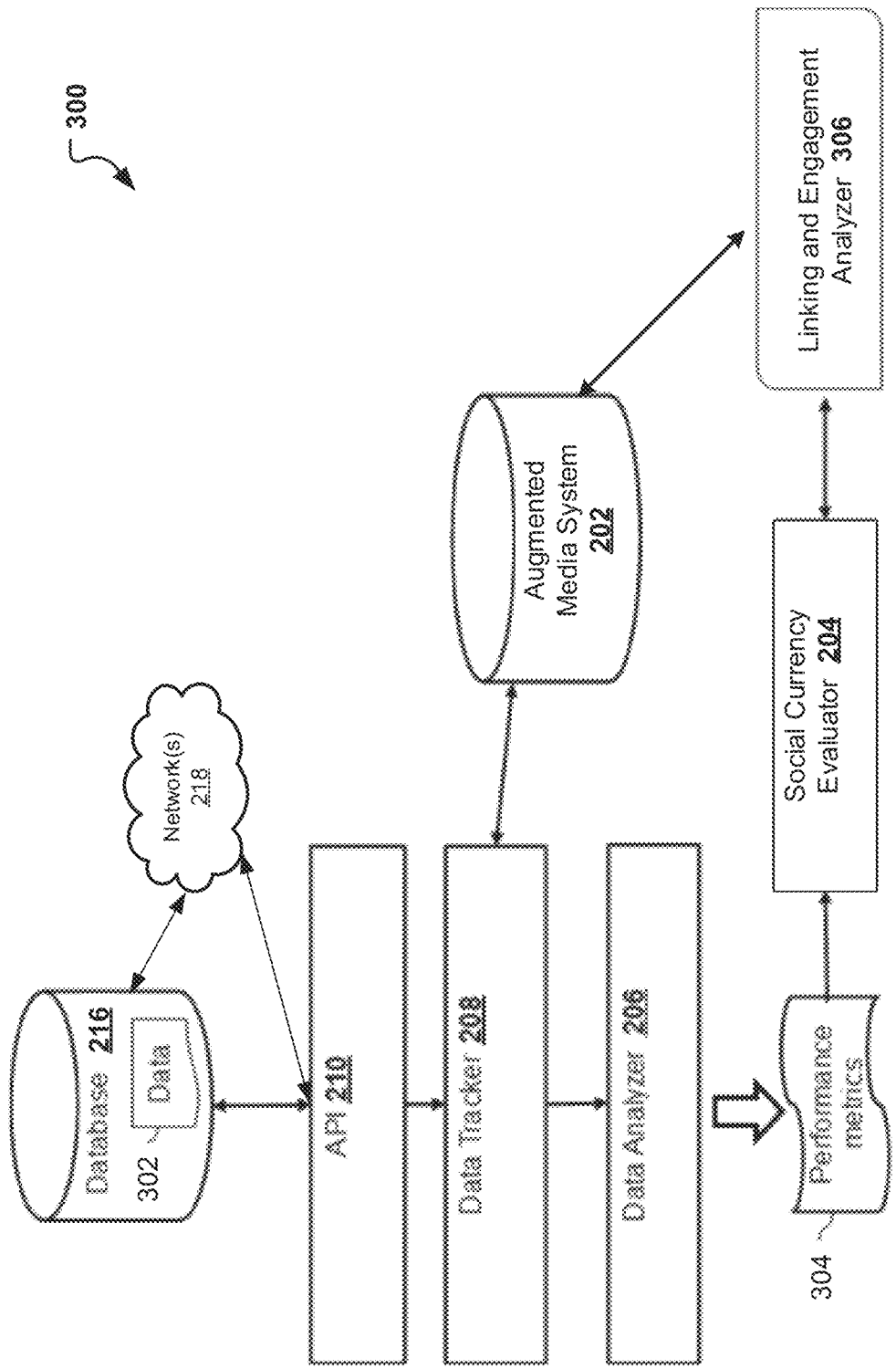
FIG. 3 illustrates monitoring and analysis using augmented media intelligence.

FIG. 3 presents the process for the augmented media system 202 as a technical solution and media platform designed to provide content in a time sensitive manner. In particular, FIG. 3 illustrates a system 300 for the monitoring and analysis performed using augmented media intelligence. As previously indicated, the media data 302 may arrive from external sources and/or peripherals 220-224 via one or networks 218 which scrape and ingest data regarding a particular company, platform, campaign, product, etc., of interest. In some instances, the media data 302 obtained is classified and stored in a database 216 for performing the data analytics, and for building machine learning algorithms for deeper insights. In some instances, the media data 302 may be stored in database 216 and classified into a corresponding library based on the content. In other instances, database 216 may also be used to store other enterprise business data which can be relevant in the data analytics resulting from machine learning co-relation and causation discovery. For example, key performance indicators (KPIs) may be stored and used during the data analytics in conjunction with artificial intelligence and algorithms to determine the impact by the media. Classification and data analytics may be performed using statistical models, neural networks, and other machine learning algorithms where trends, graphs, and correlations can be obtained.

As illustrated in FIG. 3, the media data 302 stored and/or retrieved may proceed to an application programming interface 210 where the database 216 and external devices can interact with the augmented media system 202. The API 210 can simultaneously communicate with at least the data tracker 208. Further, the APIs can be used to build a user experience and solution on the platform. The API 210 also communicates with at least a data tracker 208. As previously indicated, the API 210 can enable the data tracker module 208 to retrieve data from database nodes, servers, and external devices, and/or monitor movements of the data across the database nodes and other media data deriving from the network(s) 218. The data tracker 208 enables the ability to track influencers and others who can impact a company, brand, sentiment, or the like and allows the opportunity to manage those making an impact pro-actively to deliver value. Monitoring and listening via the data tracker also provides groups within an organization, for example, a communications team, with insight and analysis of the media data 302 via a media platform.

Following data tracking, the system 300 may continue to the data analysis portion of the process of computing the analytics desired by a team, organization, group, individual, corporation or the like. As indicated, data analyzer 206 (e.g., analytics module 206) can be designed to perform the real-time analytics desired in a platform designed for augmented media intelligence. In particular, descriptive analytics 102, diagnostics analytics 104, predictive analytics 106, prescriptive analytics and cognitive analytics 107 can occur on the analytics module 206 for monitoring, responding, predicting and prescribing how to respond to a campaign, event, feedback, etc. To perform such analytics, the data analyzer 206 may include an artificial intelligence engine with natural language processing capabilities in order to respond to complex queries. Additionally, statistical analytical models may also be used in such analytics. For example, the statistical analytical models may be used to identify trends and/or locate outliers. In addition, the data analyzer 206 may be used in conjunction with the data tracker 208 for trends and correlations between media data 302 posts such that the data collected may be used to predict future behaviors and/or plan future media events. Such events, data trends may be used in performance metrics 304, where the performance metrics may then be used to proactively generate one or more performance reports for presentation in response to a user request. For example, the generated performance reports may be presented on a dashboard interface. Since the performance reports are generated based on real-time tracking of data, users may confidently use the information presented in the reports to make decisions. Further, a query may be generated to retrieve the data and associated performance metrics corresponding to one or more domains within the enterprise system, and another query may be generated to retrieve the data and associated performance metrics corresponding to one or more work flows defined by the augmented media system 300. In response to the query, the data may be retrieved from the database 216 and/or other external sources and presented in an interactive user interface to the user making the request. As indicated, performance reports may be presented on a dashboard interface. In some embodiments, the data may be presented in the form of a graph, statistics, maps, and other relevant diagrams based on the criteria specified by the user. FIGS. 4A-4C include exemplary interactive interfaces that may be used in the presentation of such data. These exemplary interactive interfaces will be described in more detail below and in conjunction with FIGS. 5A-5B.

In some embodiments, a social currency evaluator 204 may be part of the process in system 300. The social currency evaluator 204 can be used to provide personalized content in real-time to a user. In some instances, the social currency evaluator 204 may arrive after the performance metrics are received to provide added detail on individual's behaviors and propensity to engage in an event. The social currency evaluator 204 can further be used for profile stitching, analyzing social behaviors, and engaging key individuals to influence successful outcomes. Therefore, understanding the individual's social currency can then be used by a linking and engagement analyzer 306 for linking the behaviors with the groups and engaging with them to impact business key performance indicators. In other instances, the social currency evaluator 204 may be used prior to the performance metrics in order to perform personalized performance metrics to the user. For example, the social currency evaluator 204 may be used to present graphs and other relevant information to the user in the form of the interactive user interfaces tailored to present the data most relevant to the individual and/or audience. Therefore, the data received, metrics collected, and social currency determined, may be feedback to the augmented media system 202 in order to provide learned and more accurate assessments. The system 300 has a feedback loop that can create a constant stream of self-reinforcing activity.

To illustrate an exemplary process of how an organization flow may run using system 300, consider a marketing group within an organization. The marketing group may use an augmented media system 202 to determine how to best market a new product for release. Concurrently, digital media is continually monitored for relevant events and possible crisis. The crises identified can then be addressed through close assessment. The assessment can include understanding the crisis by region, timing, sentiments, etc. so that proper personalized stitching and engagement may occur with key influencers in an effort to minimize the impact business KPIs. Note that the analysis and assessments performed throughout the process occurs using any combination of statistical models, natural language processing, and artificial intelligence. The data analytics, as indicated above, can include the use of diagnostic analytics, predictive, prescriptive and cognitive analytics.

As indicated, social currency evaluator 204 can be used to provide performance metrics on an individual's or organizations behaviors as well as for understanding how the behaviors can be used for understanding the impact and influence can have on a business and the business key performance metrics. Individuals or organizations whose behaviors or opinions expressed can have a significant media reach are oftentimes referred to as influencers. Influencers can contribute through articles, analyses, tweets, videos, interviews, and the like in the media. Influencers can have a following or people and/or organizations that track their opinions and messages. These opinions or messages have a reach or a number of people or organizations that read and/or engage with them. Engagement can include comments, shares, re-tweets, likes, mentions, views, etc. which can have a lasting impact or a group, organization, corporation, or other entity. Going forward, group, organization, individual, cooperation, organization, etc. will be referred to as simply "organization." Knowing who the influencers are with the maximum reach and having a strategy to engage with them is beneficial to the organization. For example, an influencer's opinion can influence an organization's strategy, customer's purchasing decisions, stockholder's investment strategies, etc. Therefore, knowing and understanding an influencer's reach may be beneficial as engagement with the influencer can help maximize a positive message and ensure value is delivered for the organization.

Figure 4:
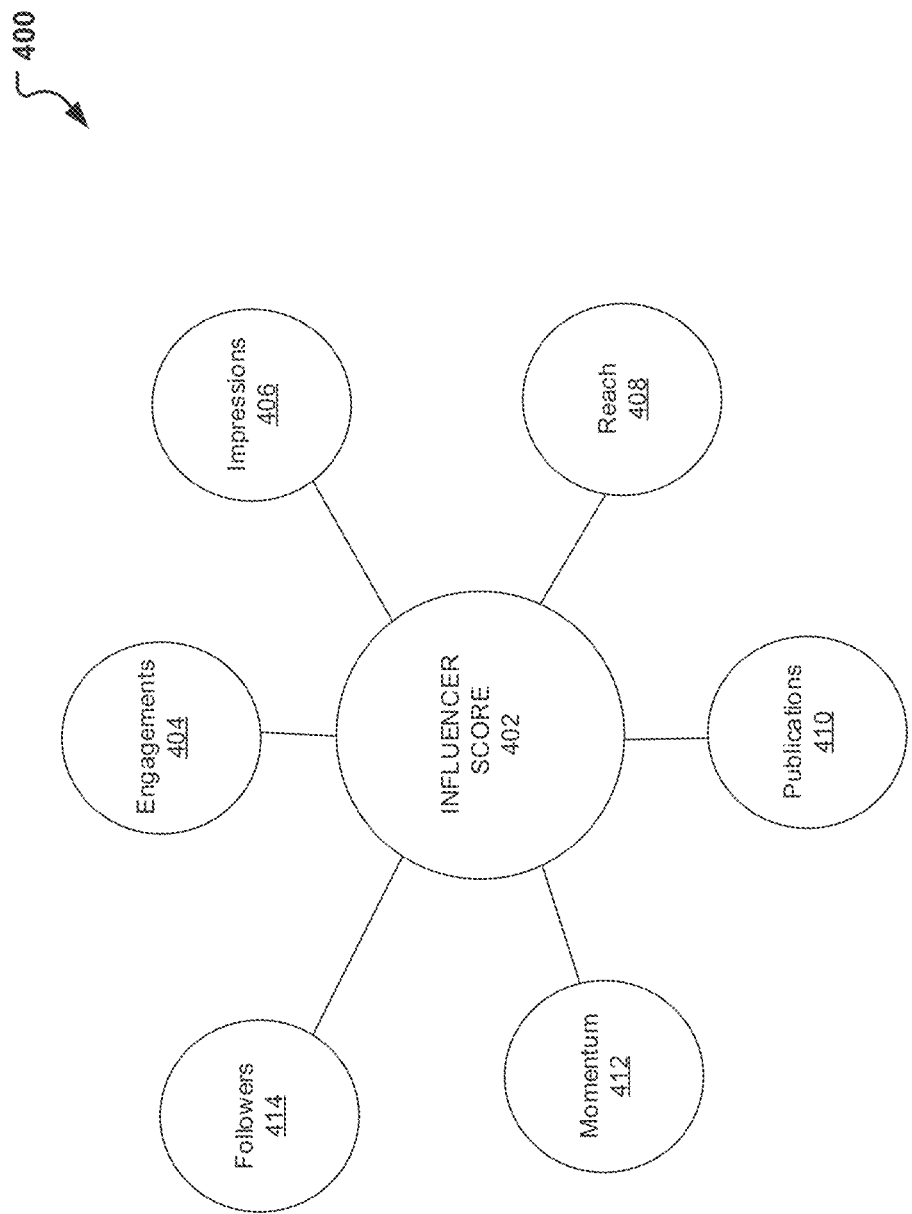
FIG. 4 illustrates an exemplary influencer scoring model use to understand influencer reach within the augmented media intelligence ecosystem.

In one embodiment, the data analytics performed within the social currency evaluator 204 can include an influencer module designed to understand an influencer reach within the augmented media intelligence ecosystem. Turning to FIG. 4, an exemplary influencer scoring model 400 use to understand influencer reach within the augmented media intelligence ecosystem is illustrated. In particular, FIG. 4 illustrates various components 424-414 which may play a role in determining the influencer score 402. For example, the influencer score may be a function of one or more of the components illustrated in FIG. 4. In one embodiment, the influencer score 402, may comprise an engagement component. The engagement 404 component can include a summation of all organizations who viewed the post, tweet, video, mention, like, etc. from the influencer. Additionally, or alternatively, the engagement component 404 can correspond to number of engagements (e.g., re-tweets, likes, shares, etc.) that have occurred in response to a post by the influencer. In another embodiment, the influencer score 402 can comprise an impressions component 406. The impressions component 406 can include the number of impressions or views received by the post by the influencer. Still in another embodiment, the influencer score can include a reach component 408 and a publications component 410. The reach can include a count of the number of people or organizations that read and/or engage with the influencer. Note that the reach may be by state, country, region, or even world wider. The publication component 410 deals with the number of publications or media events published by the influencer. Still yet in another embodiment, the influencer score can also include a momentum component 412 and a followers component 414. The momentum component 410, can include a measure of how fast a story builds based on a post, story, or other publication by the influencer. In addition, momentum can be defined by an engagement over a predetermined period of time. The followers component 414 includes a summation of the number of organizations which read the posts by the influencer.

Note that more or less components may be used to determine an influencer score 402. Additionally, each of the components 404-414 may be used to compute the influencer score 402, based on a predetermined percentage, based on the event, time period, etc. In one embodiment, each of the components 404-414 may be used to determine the influencer score 402 at least based in part on a weighted average. In one example, the influencer score 402 may be a function of a percentage of each of the components 404-414. In this example, each component may provide a fraction of the total influencer score 402, for instance, engagements 404 (20%), impressions 406 (10%), reach 408 (20%), publications 410 (20%), momentum 412 (10%), and followers 414 (10%). Once the influencer score 402 is determined, this score along with other details may be reported using the augmented media intelligence ecosystem of FIGS. 1-3. Note that in addition to the influencer score, other data obtained by the augmented media intelligence ecosystem 200 in conjunction with artificial intelligence to derive the impact of media events on the business' key performance indicators using correlation algorithms and/or other analytical measures.

Figure 5A:
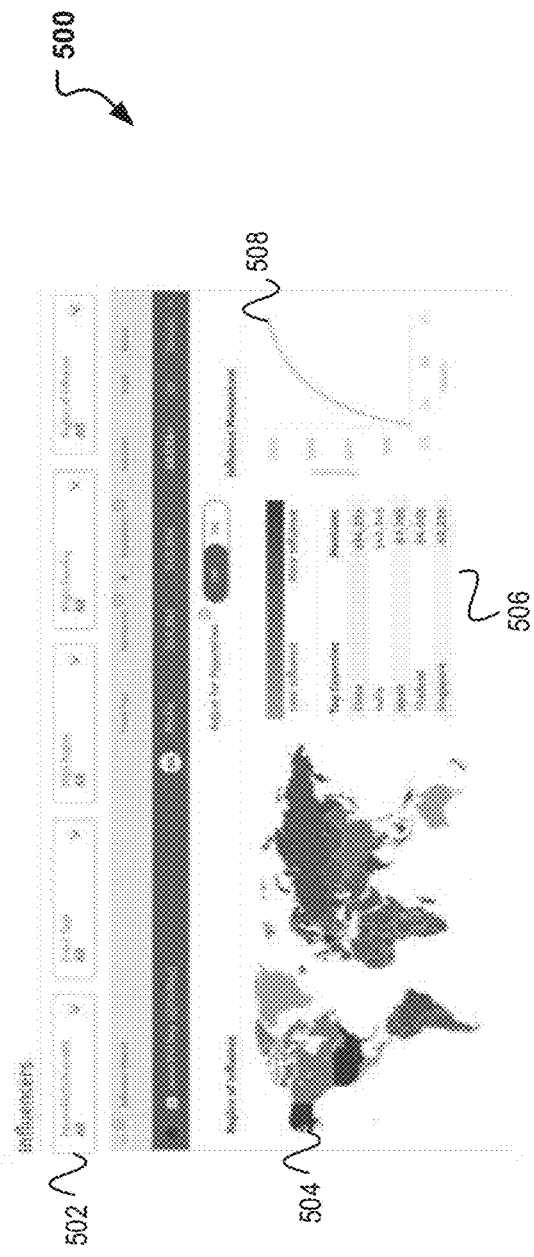
FIGS. 5A-5B illustrate exemplary interactive interfaces generated by the data analytics and visualization system using the classification model.
Figure 5B:
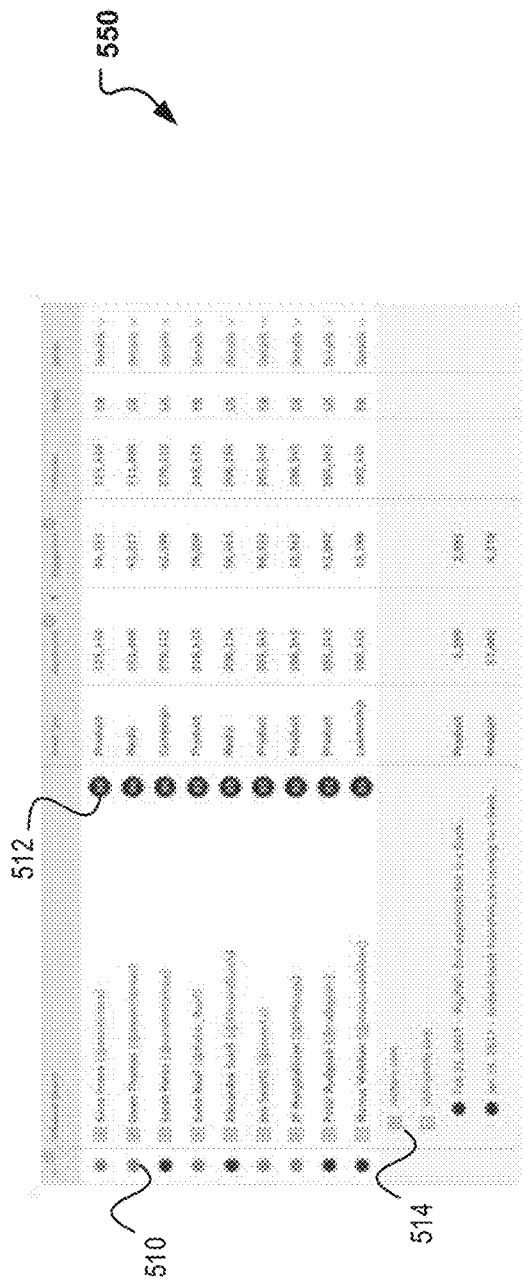

During the tracking and monitoring of the content, interactive user interfaces may be used for the presentation of the information. FIGS. 5A-5B provide data visualizations for understanding and illustrating influencer details using the augmented media intelligence ecosystem. In particular, FIGS. 5A-5B illustrate exemplary interactive user interfaces that may be presented to a user of the augmented media system 202. Turning to FIG. 5A, a first exemplary interactive user interface 500 is presented. The first exemplary interactive user interface 500 illustrates a page on a dashboard of the augmented media system 202 designed for a team or organization trying to understand and plan how to best respond to a media reaction to a post or other commentary by an influencer. As illustrated in interactive user interface 500, a general display is presented where in all influencers followed 504 and impact are illustrated. Interactive user interface 500 includes a dashboard like display wherein various options for selection. For example, options 502 can include specific details on favorable/unfavorable posts, event type, region, country, etc. Additionally, the interactive user interface 500 can include maps 504 illustrating the various regions with highlight on those regions with the largest influence based on some predefined key, table, color coding scheme, etc. and can include and illustration of those regions with maximum engagement. Further to the map 504 regions, a table illustrating top mentions and corresponding regions can also be included in the interactive user interface 500. Other options, updates, and visualizations possible on the interactive user display 500 can also include graphs, charts, stats, etc. For example, a chart can be included which provides a graph disclosing influencer momentum 508. This chart can explain the impact on momentum as mentions increase and the time passes. As indicated, momentum can be used to measure of how fast a story builds based on a post, story, or other publication by the influencer. Thus, influencer momentum 508 can also be plotted and put on display on the interactive user interface 500.

Note that further to the interactive user interfaces 500, 550 presented, other data may also be measured and presented as an indication of resilience. For example, as indicated media sentiment can be measured, this can include likes, impressions, mentions shares, comments, and the like. As another example, customer contact volumes may be summarized and presented as well as net new active accounts created. Still as another example, account closures or lack of use may be considered. Also note that although the interactive user interfaces presented above and in conjunction with FIGS. 5A-5B are presented and described for a company, such customized information is available to other organizations. For example, a marketing group may benefit obtaining user mentions, leadership and advertisement companies can benefit from media resiliency information and teams within the organization itself can also benefit and respond using such information.

Figure 6:
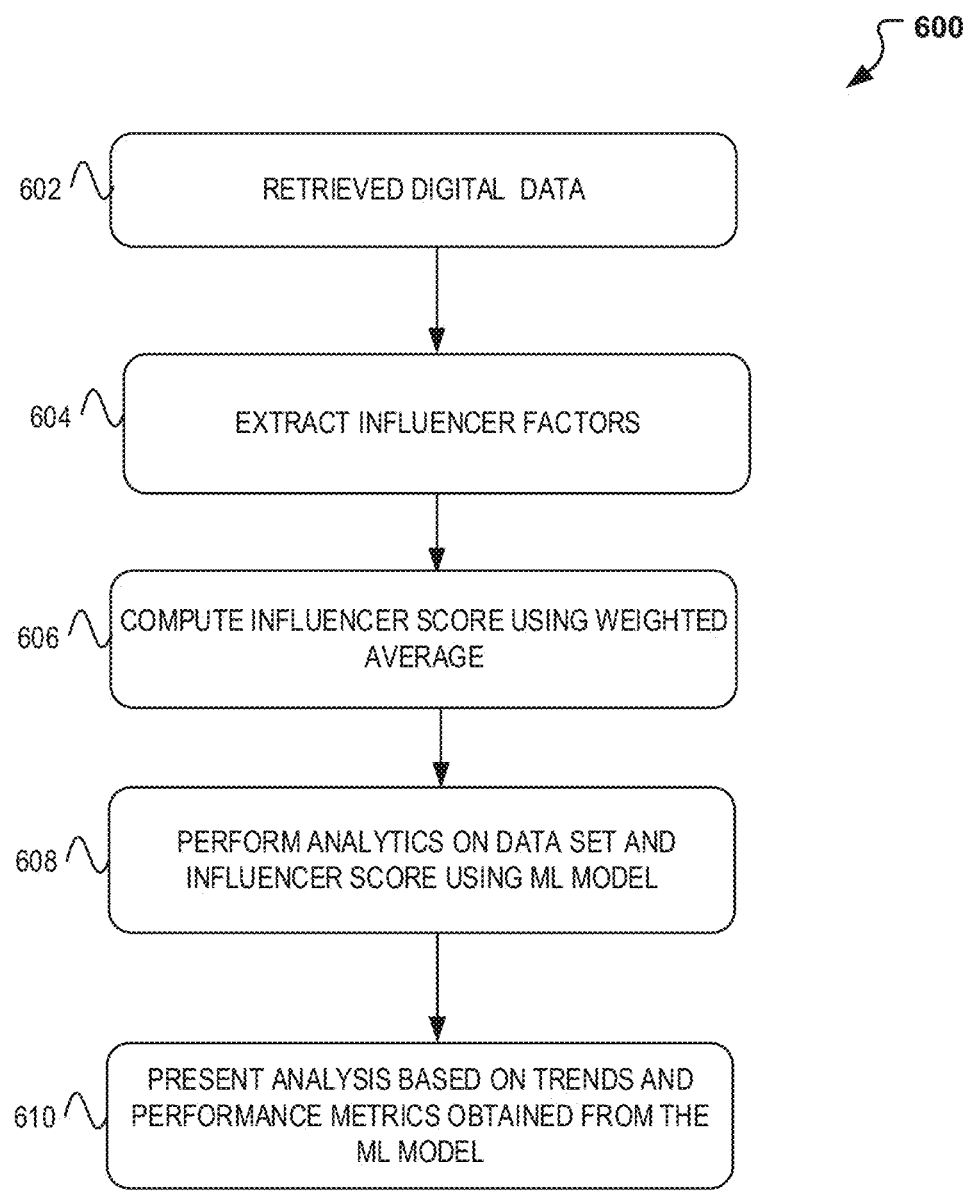
FIG. 6 illustrates a flow diagram illustrating operations for generating resilience within the augmented media intelligence ecosystem.
Figure 7:
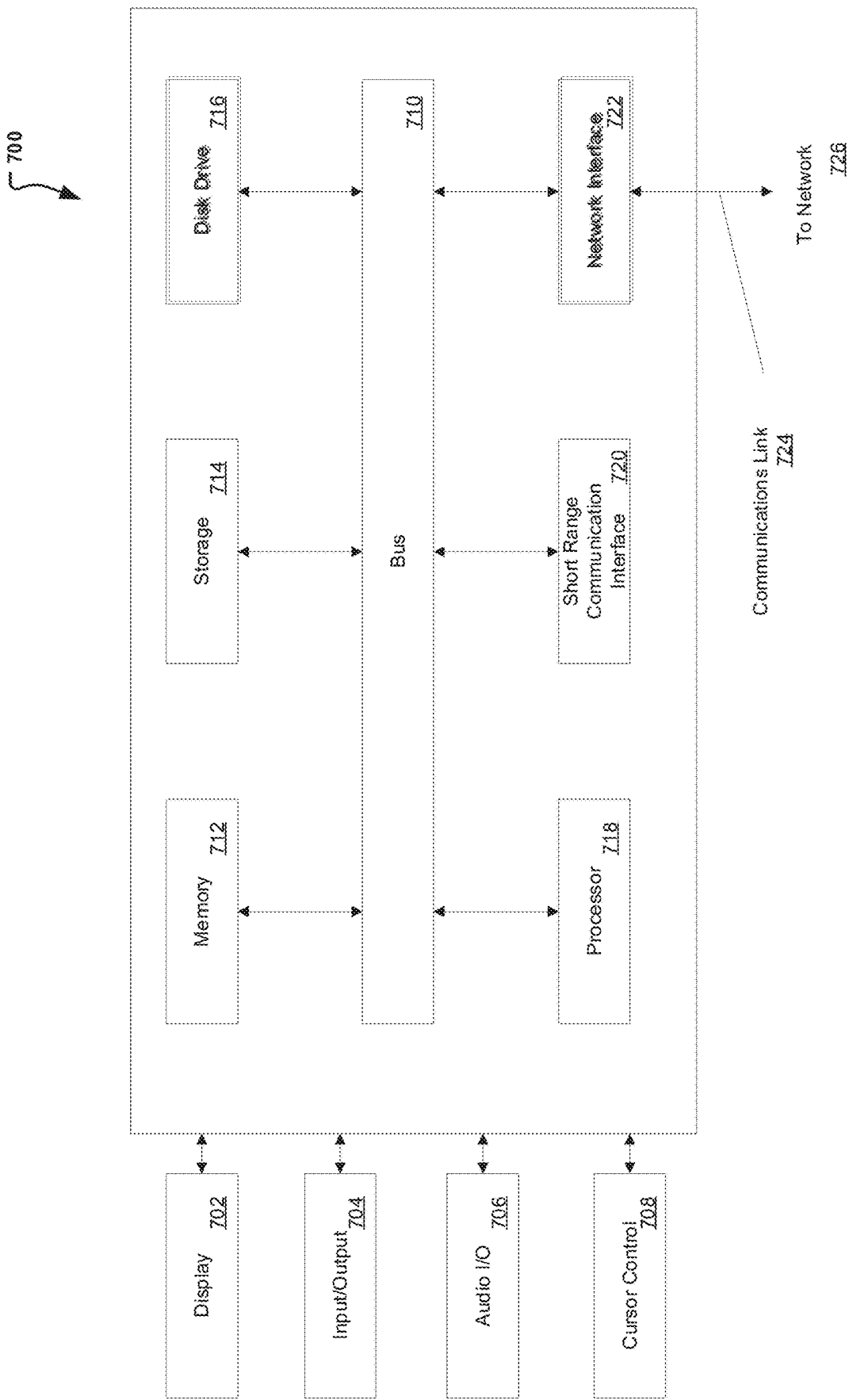
FIG. 7 illustrates an example block diagram of a computer system suitable for implementing one or more devices of the communication systems of FIGS. 1-6.

To illustrate how the interactive user interfaces and understanding influencer reach is determined within the augmented media system 202, FIG. 6 is introduced which illustrates example process 600 that may be implemented on a system 700 of FIG. 7. In particular, FIG. 6 illustrates a flow diagram illustrating how an augmented media system provides influencer information using digital media. According to some embodiments, process 600 may include one or more of operations 602-610, which may be implemented, at least in part, in the form of executable code stored on a non-transitory, tangible, machine readable media that, when run on one or more hardware processors, may cause a system to perform one or more of the operations 602-610.

Process 600 may begin with operation 602, where data is retrieved. As previously indicated, large data is constantly collected by devices, through networks, external peripherals and other means. The data received, scraped, and gathered is received and/or retrieved, then cleansed, transformed and loaded in a data model designed and built for this system in some instances stored for later use. This data retrieved in real-time and/or retrieved from a database is collected oftentimes needs to be organized and analyzed. As previously indicated, the data may be stored and organized based on various predetermined categories which are useful in not only capturing and organizing the digital media data retrieved, but in providing the information needed for obtaining an influencer measure or score. For example, in one embodiment, the digital data retrieved may be stored in various databases, servers, nodes, and the like that are distinguished as product, media, campaign, leadership, etc. In another embodiment, the data retrieved may be categorized by influencer, source, metions, etc.

At operation 604, from the data retrieved and categorized, influencer factors may be extracted. In particular, at operation 604, from the data retrieved and categorized, data including impressions, reach, publications, momentum, followers, engagements, etc. may be pulled, summed, and used in computing an influencer score at operation 606. In some embodiments, the influencer score may be computed using a weighted average on the influencer factors or components.

As the influencer score is known, process 600 continues to operation 608, where the influcencer score in conjunction with the data retrieved may be used for performing analytics. That is to say the data retrieved and influencer score may be used for computing an influencer ID, for ranking the influencers, understanding an influencer reach by region, source, post, etc.

With the analytics in place, the results obtained may be visually presented at operation 610, with trends and performance metrics visualized using at least one interactive user interface similar to the one described above and in conjunction with FIGS. 5A-5B. Further, graphs, charts, plots, tables and the like may also be displayed and visualized using the augmented media intelligence ecosystem 200 and used to plan, communicate, and engage with influencers so that posts are steered in a positive direction and impact to an organizations KPI is minimized if unfavorable. Further, similar stories may also be correlated to determine a plan for engagement with an influencer, wherein the correlated similar stories are presented on the report generated. Thus, at operation 610, the performance metrics presented can be in the form of graphs, maps, statistics, and other relevant forms of visualization data.

FIG. 7 illustrates an example computer system 700 in block diagram format suitable for implementing on one or more devices of the system in FIGS. 1-6 and in particular augmented media system 202. In various implementations, a device that includes computer system 700 may comprise a personal computing device (e.g., a smart or mobile device, a computing tablet, a personal computer, laptop, wearable device, PDA, etc.) that is capable of communicating with a network 726. A service provider and/or a content provider may utilize a network computing device (e.g., a network server) capable of communicating with the network. It should be appreciated that each of the devices utilized by users, service providers, and content providers may be implemented as computer system 700 in a manner as follows.

Additionally, as more and more devices become communication capable, such as new smart devices using wireless communication to report, track, message, relay information and so forth, these devices may be part of computer system 700. For example, windows, walls, and other objects may double as touch screen devices for users to interact with. Such devices may be incorporated with the systems discussed herein.

Computer system 700 may include a bus 710 or other communication mechanisms for communicating information data, signals, and information between various components of computer system 700. Components include an input/output (I/O) component 704 that processes a user action, such as selecting keys from a keypad/keyboard, selecting one or more buttons, links, actuatable elements, etc., and sending a corresponding signal to bus 710. I/O component 704 may also include an output component, such as a display 702 and a cursor control 708 (such as a keyboard, keypad, mouse, touchscreen, etc.). In some examples, I/O component 704 other devices, such as another user device, a merchant server, an email server, application service provider, web server, a payment provider server, and/or other servers via a network. In various embodiments, such as for many cellular telephone and other mobile device embodiments, this transmission may be wireless, although other transmission mediums and methods may also be suitable. A processor 718, which may be a micro-controller, digital signal processor (DSP), or other processing component, that processes these various signals, such as for display on computer system 700 or transmission to other devices over a network 726 via a communication link 724. Again, communication link 724 may be a wireless communication in some embodiments. Processor 718 may also control transmission of information, such as cookies, IP addresses, images, and/or the like to other devices.

Components of computer system 700 also include a system memory component 714 (e.g., RAM), a static storage component 714 (e.g., ROM), and/or a disk drive 716. Computer system 700 performs specific operations by processor 718 and other components by executing one or more sequences of instructions contained in system memory component 712 (e.g., for engagement level determination).

Logic may be encoded in a computer readable medium, which may refer to any medium that participates in providing instructions to processor 718 for execution. Such a medium may take many forms, including but not limited to, non-volatile media, volatile media, and/or transmission media. In various implementations, non-volatile media includes optical or magnetic disks, volatile media includes dynamic memory such as system memory component 712, and transmission media includes coaxial cables, copper wire, and fiber optics, including wires that comprise bus 710. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, hard disk, magnetic tape, any other magnetic medium, CD-ROM, any other optical medium, RAM, PROM, EPROM, FLASH-EPROM, any other memory chip or cartridge, or any other medium from which a computer is adapted to read.

Components of computer system 700 may also include a short range communications interface 720. Short range communications interface 720, in various embodiments, may include transceiver circuitry, an antenna, and/or waveguide. Short range communications interface 720 may use one or more short-range wireless communication technologies, protocols, and/or standards (e.g., Wi-Fi, Bluetooth®, Bluetooth Low Energy (BLE), infrared, NFC, etc.).

Short range communications interface 720, in various embodiments, may be configured to detect other devices with short range communications technology near computer system 700. Short range communications interface 720 may create a communication area for detecting other devices with short range communication capabilities. When other devices with short range communications capabilities are placed in the communication area of short range communications interface 720, short range communications interface 720 may detect the other devices and exchange data with the other devices. Short range communications interface 720 may receive identifier data packets from the other devices when in sufficiently close proximity. The identifier data packets may include one or more identifiers, which may be operating system registry entries, cookies associated with an application, identifiers associated with hardware of the other device, and/or various other appropriate identifiers.

In some embodiments, short range communications interface 720 may identify a local area network using a short range communications protocol, such as WiFi, and join the local area network. In some examples, computer system 700 may discover and/or communicate with other devices that are a part of the local area network using short range communications interface 720. In some embodiments, short range communications interface 720 may further exchange data and information with the other devices that are communicatively coupled with short range communications interface 720.

In various embodiments of the present disclosure, execution of instruction sequences to practice the present disclosure may be performed by computer system 700. In various other embodiments of the present disclosure, a plurality of computer systems 700 coupled by communication link 724 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein may be embodied in one or more computer readable media or be in communication with one or more processors to execute or process the techniques and algorithms described herein.

A computer system may transmit and receive messages, data, information and instructions, including one or more programs (i.e., application code) through a communication link 724 and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable media. It is also contemplated that software identified herein may be implemented using one or more computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on the user and user device, however, a customer, a merchant, a service or payment provider may otherwise presented with tailored information. Thus, "user" as used herein can also include charities, individuals, and any other entity or person receiving information. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method comprising:
   accessing data associated with a plurality of social media posts related to a certain story made by an influencer across a plurality of social media platforms;
   determining influencer factors from the data, wherein the influencer factors comprise one or more of a respective momentum and a respective reach of each of the respective ones of the plurality of social media posts, wherein each of the respective momentum indicates a user engagement with, and how fast the story builds based on, each of the respective ones of the plurality of social media posts across the plurality of social media platforms, and wherein each of the respective reach is indicative of a number of users in a certain region that engage with the social media post across the plurality of social media platforms;
   generating an influencer score for the plurality of social media posts and for the certain region based on the influencer factors including one or more of the momentum and the reach of the influencer for the plurality of social media posts; and
   using the influencer score for the certain region to perform an analysis of the plurality of the social media posts related to the certain story.

2. The method of claim 1,
   wherein the influencer is associated with an influencer profile; and
   wherein said generating the influencer score is further based on the influencer profile.

3. The method of claim 1, further comprising:
   providing one or more of the influencer score and a result of the analysis to a user device that enables a presentation of the result on an interactive user interface of the user device.

4. The method of claim 3, wherein the providing the influencer score comprises providing engagement data that enables a display of the engagement data in the certain region on the interactive user interface to indicate differences in user engagement with the plurality of social media posts on across the plurality of social media platforms at least in the certain region.

5. The method of claim 1, wherein the accessing the data comprises accessing real-time digital data associated with the plurality of social media posts by monitoring interactions with the plurality of social media post across the plurality of social media platforms.

6. The method of claim 1, wherein each of the respective momentum is associated with a respective momentum weight, wherein each of the respective reach is associated with a respective reach weight, wherein the generating the influencer score uses, for each of the respective ones of the plurality of social media posts, one or more of weighted averages of the respective momentums based on the respective momentum weight and of the respective reach based on the respective reach weight.

7. The method of claim 1, wherein the influencer factors further comprise one or more of respective user engagements with an influencer profile that is associated with the influencer, a number of publications to each of the plurality of social media platforms made by the influencer, a number of impressions associated with each of the plurality of social media posts, and a number of followers of the influencer on each of the plurality of social media platforms.

8. The method of claim 1, further comprising:
   determining a rank of the influencer based on the influencer score relative to influencer scores of other influencers; and
   providing the rank of the influencer to a user device that enables a presentation of the rank in an interactive user interface of the user device.

9. A device, comprising:
   a non-transitory memory storing instructions; and
   a processor configured to execute the instructions to cause the device to:
      receive a query relating to an analysis of a plurality of social media posts with relation to a certain story, the plurality of social media posts made by at least one influencer across a plurality of social media platforms;
      access data associated with the plurality of social media posts related to a certain story made by the at least one influencer across the plurality of social media platforms;

responsive to the query, determine respective influencer factors, from the data, for each of the at least one influencer, wherein the influencer factors comprise one or more of a respective momentum and a respective reach of each of the respective ones of the plurality of social media posts for each of the at least one influencer, wherein each of the respective momentum indicates a user engagement with, and a measure of how fast the story spreads based on, each of the respective ones of the plurality of social media posts for the each of the at least one influencer across the plurality of social media platforms, wherein each of the respective reach is indicative of a number of users in a certain region that engage with the social media post for the each of the at least one influencer; and generate one or more respective influencer scores for the plurality of social media posts and for the certain region based on the influencer factors including one or more of the momentum and the reach of each respective one of the at least one influencer for the plurality of social media posts, wherein the one or more respective influencer scores are used for the analysis of the plurality of social media posts with relation to the certain story.

10. The device of claim 9,
wherein one of the at least one influencer is associated with an influencer profile; and
wherein the one or more respective influencer scores are generated further based on the influencer profile.

11. The device of claim 10, wherein executing the instructions further causes the device to provide the one or more respective influencer scores including providing engagement data that enables a display of the one or more respective influencer scores in the certain region on an interactive user interface to indicate differences in user engagement with the plurality of social media posts on the plurality of social media platforms.

12. The device of claim 9, wherein the data is accessed at least in part by accessing real-time digital data associated with the plurality of social media posts by monitoring interactions with the plurality of social media post across the plurality of social media platforms.

13. The device of claim 9, wherein each of the respective momentum is associated with a respective momentum weight, wherein each of the respective reach is associated with a respective reach weight, wherein the one or more respective influencer scores are generated by using, for each of the respective ones of the plurality of social media posts, one or more of weighted averages of the respective momentums based on the respective momentum weight and of the respective reach based on the respective reach weight.

14. The device of claim 9, wherein the influencer factors further comprise one or more of respective user engagements with each respective influencer of the at least one influencer, a number of publications to each of the plurality of social media platforms made by the each respective influencer of the at least one influencer, a number of impressions associated with each of the plurality of social media posts, and a number of followers of the each respective influencer of the at least one influencer on each of the plurality of social media platforms.

15. A non-transitory machine-readable medium having instructions stored thereon, the instructions executable to cause performance of operations comprising:
receiving a query relating to an analysis of a plurality of social media posts with relation to a certain story, the plurality of social media posts made by at least one influencer across a plurality of social media platforms;
accessing data associated with the plurality of social media posts related to a certain story made by the at least one influencer across the plurality of social media platforms;
responsive to the query, determining respective influencer factors, from the data, for each of the at least one influencer, wherein the influencer factors comprise one or more of a respective momentum and a respective reach of each of the respective ones of the plurality of social media posts for each of the at least one influencer, wherein each of the respective momentum indicates a user engagement with, and a measure of a speed at which the story builds based on, each of the respective ones of the plurality of social media posts for the each of the at least one influencer across the plurality of social media platforms, wherein each of the respective reach is indicative of a number of users in a certain region that engage with the social media post for the each of the at least one influencer across the plurality of social media platforms; and
generating one or more respective influencer scores for the plurality of social media posts and for the certain region based on the influencer factors including one or more of the momentum and the reach of each respective one of the at least one influencer for the plurality of social media posts, wherein the one or more respective influencer scores are used for the analysis of the plurality of social media posts with relation to the certain story.

16. The non-transitory machine-readable medium of claim 15,
wherein one of the at least one the influencer is associated with an influencer profile; and
wherein said generating the one or more respective influencer scores is further based on the influencer profile.

17. The non-transitory machine-readable medium of claim 16, wherein the operations further comprise providing the one or more respective influencer scores including providing engagement data that enables a display of the one or more respective influencer scores in the certain region on an interactive user interface to indicate differences in user engagement with the plurality of social media posts on the plurality of social media platforms.

18. The non-transitory machine-readable medium of claim 15, wherein the accessing the data comprises accessing real-time digital data associated with the plurality of social media posts by monitoring interactions with the plurality of social media post across the plurality of social media platforms.

19. The non-transitory machine-readable medium of claim 15, wherein each of the respective momentum is associated with a respective momentum weight, wherein each of the respective reach is associated with a respective reach weight, wherein the generating the one or more respective influencer scores uses, for each of the respective ones of the plurality of social media posts, one or more of weighted averages of the respective momentums based on the respective momentum weight and of the respective reach based on the respective reach weight.

20. The non-transitory machine-readable medium of claim 15, wherein the influencer factors further comprise one or more of respective user engagements with each respective influencer of the at least one influencer, a number of publications to each of the plurality of social media platforms made by the each respective influencer of the at least one influencer, a number of impressions associated with each of the plurality of social media posts, and a number of followers of each respective influencer of the at least one influencer on each of the plurality of social media platforms.

\* \* \* \* \*